US008358285B2

(12) United States Patent
Leung et al.

(10) Patent No.: US 8,358,285 B2
(45) Date of Patent: Jan. 22, 2013

(54) METHOD AND APPARATUS FOR SCANNING A TOUCHSCREEN WITH MULTI-TOUCH DETECTION USING MASTER/SLAVE DEVICES

(75) Inventors: Kafai Leung, Austin, TX (US); Bradley Martin, Austin, TX (US); Steve Gerber, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 410 days.

(21) Appl. No.: 12/775,447

(22) Filed: May 6, 2010

(65) Prior Publication Data

US 2010/0283760 A1 Nov. 11, 2010

Related U.S. Application Data

(60) Provisional application No. 61/176,025, filed on May 6, 2009.

(51) Int. Cl.
*G06F 3/045* (2006.01)

(52) U.S. Cl. ........................................ 345/174; 345/173

(58) Field of Classification Search .................. 345/173, 345/174
See application file for complete search history.

(56) References Cited

U.S. PATENT DOCUMENTS 7,848,825 B2 * 12/2010 Wilson et al. .................. 700/3
2010/0328237 A1 * 12/2010 Chang et al. ............... 345/173

* cited by examiner

*Primary Examiner* — Kevin M Nguyen
*Assistant Examiner* — Sepideh Ghafari

(57) ABSTRACT

A touch panel scan system is disclosed for detecting a change in mutual capacitance on the surface of a touch panel. A first touch detect device is provided having a transmitter for transmitting a transmit signal to a select one of a plurality of first lines on a first edge of a touch panel to facilitate a single line scan operation. A second touch detect device is interfaced with a select one or ones of second lines on a second edge of the touch panel having a receiver for receiving therefrom and processing thereof transmit signals coupled thereto from the select one or ones of the first lines to detect changes in a mutual capacitance associated with the select one or ones of the second lines and the first line. At least one of the first or second touch detect devices functions as a master and the other functions as a slave, with the master coupled to the slave and generating a SYNC signal to initiate a single scan operation of a select one of the first lines.

20 Claims, 8 Drawing Sheets

METHOD AND APPARATUS FOR SCANNING A TOUCHSCREEN WITH MULTI-TOUCH DETECTION USING MASTER/SLAVE DEVICES

CROSS-REFERENCE TO RELATED APPLICATIONS

This application claims priority from U.S. Provisional Application No. 61/176,025, filed May 6, 2009, entitled MASTER-SLAVE TRIGGERING FOR CAPACITIVE SENSING APPLICATIONS, which is incorporated herein in its entirety.

TECHNICAL FIELD

This invention pertains in general to capacitive sensing and, more particularly, to a system utilizing multiple chips for the capacitive sensing operation.

BACKGROUND

Capacitive touch sensing of large touch screens can be difficult. The reason for this is that capacitive sensing integrated circuits have a finite number of pins such that they can interface with a finite number of rows and columns on a touch screen. Users expect that a large screen will remain as sensitive to a finger touch as with a small touch screen. Providing high resolution over a large screen utilizes a large number of sensors. This involves expanding the number of capacitive sensor integrated circuits for the sensing operation. In some sensing operations, such as those utilizing multi touch resolve (MTR), a signal is input to one row or column line and coupled to the intersecting column or row-lines through the mutual capacitance of the intersection between rows and columns. By evaluating the received signal, any change in the mutual capacitance can be detected, representing a touch. This operates in that the row/column lines on the transmit side of the MTR operation will be sequentially stepped through in multiple sensing operations. This provides a disadvantage, when using multiple sensors.

SUMMARY

The present invention disclosed and claimed herein, in one aspect thereof, comprises a touch panel scan system for detecting a change in mutual capacitance on the surface of a touch panel. A first touch detect device is provided having a transmitter for transmitting a signal to a select one of a plurality of first lines on a first edge of a touch panel to facilitate a single line scan operation. A second touch detect device is interfaced with a select one or ones of second lines on a second edge of the touch panel having a receiver for receiving therefrom and processing thereof transmit signals coupled thereto from the select one or ones of the first lines to detect changes in a mutual capacitance associated with the select one or ones of the second lines and the first line. At least one of the first or second touch detect devices functions as a master and the other functions as a slave, with the master coupled to the slave and generating a SYNC signal to initiate a single scan operation of a select one of the first lines.

BRIEF DESCRIPTION OF THE DRAWINGS

For a more complete understanding, reference is now made to the following description taken in conjunction with the accompanying Drawings in which.

DETAILED DESCRIPTION

Figure 1:
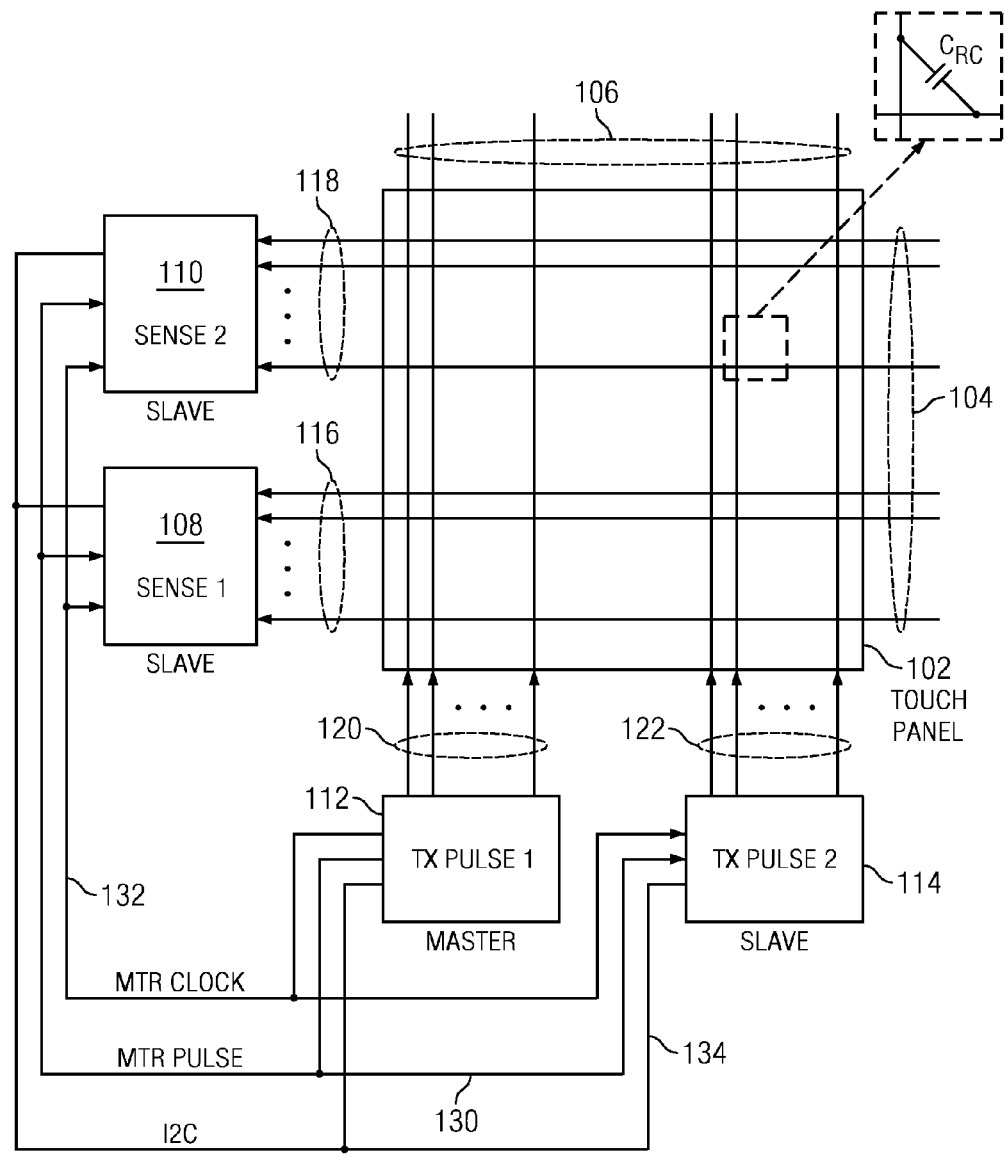
FIG. 1 illustrates a diagrammatic view of a touch panel utilizing multiple chips for the capacitive sensing operation.

Referring now to the drawings, wherein like reference numbers are used herein to designate like elements throughout, the various views and embodiments of a master-slave triggering for capacitive sensing applications using multi-touch resolve are illustrated and described, and other possible embodiments are described. The figures are not necessarily drawn to scale, and in some instances the drawings have been exaggerated and/or simplified in places for illustrative purposes. One of ordinary skill in the art will appreciate the many possible applications and variations based on the following examples of possible embodiments.

Referring now to FIG. 1, there is illustrated a diagrammatic view of a touch screen panel 102 having a plurality of capacitive sensing chips disposed thereabout. In the illustrated embodiment, the touch panel 102 has a plurality of row lines 104 and column lines 106 disposed perpendicular thereto. Each of the intersections of the row lines 104 and the column lines 106 has a row-to-column capacitance ($C_{RC}$) disposed therebetween. This is referred to as the mutual capacitance. This applies to any panel having a mutual capacitance that will change under touch/no touch.

For operation in the multi touch resolve capacitive sensing operation, a signal or charge is injected into a transmit channel which, in this embodiment, is illustrated as column lines, and the signal coupled across $C_{RC}$ to each of the row lines 104 or receive channels. The transmit channel will be referred to as the Tx channel and the receive channel will be referred to as the Rx channel. Thus, for a panel scan operation, it is necessary to inject a signal to each of the Tx channels individually and then sense the signal coupled across to each of the row lines or Rx channels individually (requiring one strobe for each conversion operation on an Rx channel by channel basis) or at the same time (one strobe for all of the Rx channels such that the conversions are all done at substantially the same time) or even in groups of Rx channels. The coupled signal will be correlated to the value of $C_{RC}$ such that, if it changes between panel scans, a determination can be made as to whether there is a change in the value of $C_{RC}$. If the signal were a sign wave, for example, the sign wave would be coupled across the intersection via $C_{RC}$ to the respective Rx channels and the amplitude of that sign wave would bear some correlation to the value of $C_{RC}$. Since $C_{RC}$ is a constant value (assuming temperature and the such have not varied) a subsequent scan of that particular Tx channel in the presence of a touch would show a different amplitude, indicating some external perturbation. By evaluating the changes in these amplitudes between subsequent panel scans in accordance with some type of predetermined algorithm, a determination can be made as to whether a touch actually existed. The primary purpose of scanning the panel 102 at any given time is to collect data on the Rx channels for later processing, i.e., comparing a current value with a past value, etc. Thus, by sequencing through each of the Tx channels from the beginning to the end and collecting data for each generation of a Tx signal on a particular Tx channel, all of the data for a panel can be collected. Each injection of a Tx signal into a Tx channel is referred to as a "strobe." This involves the receive side being set up for a given strobe and then a selected Tx channel driven by the transmitter with the Tx signal. At the end of each strobe, the next Tx channel is selected and a new strobe initiated. At the end of each strobe, the receive data is collected, processed and stored for later processing and evaluation.

There are illustrated two sense devices 108 and 110 and two transmit devices 112 and 114. The two sense devices 108 and 110 are labeled as Sense1 and Sense2, respectively. The two Tx devices 112 and 114 are labeled Txpulse1 and Txpulse2, respectively. The sense device 108 is associated with rows or Rx channels 116 and a sense device 110 is associated with rows or Rx channels 118. The Tx device 112 is associated with columns or Tx channels 120 and the Tx device 114 is associated with columns or Tx channels 122. The reason to associate different portions of the touch panel 102 with different devices is due, in the disclosed embodiment, to the possible limitation of the number of Tx channels or Rx channels that can be physically accommodated by a particular chip. For example, if the touch panel 102 had a column width of 64 columns and each Tx device 112 and 114 had a physical transmit channel capacity of 32 channels, then columns 0-31 would be associated with Tx device 112 and columns 32-63 would be associated with Tx device 114. Similarly, the two sense devices 108 and 110 may have to be divided accordingly. It may be, however, that the division is unequal for different width touch screen panels.

In order to effect an MTR capacitive sensing operation, it is necessary for each of the Tx devices 112 and 114 to sequence through all of the column lines 106 or Tx channels. To do this, Tx device 112 would sequence through the Tx channels 120 and then immediately hand off a sequencing operation to Tx device 114. Additionally, for each strobe, it would be necessary for the sense devices 108 and 110 to initiate a Read operation synchronized with the initiation of the signal output from the Tx devices 112 and 114. Thus, there must be some type of synchronization between all of the devices during the operation of the MTR.

In order to synchronize the devices, one of the devices is defined as the master and the rest are defined as the slaves. This is for the purpose or initiating a strobe. Thus, not only does the pulse have to initiate a particular Tx channel to be activated, but it must also both inform the other Tx pulse device of the initiation of a sequence and the stepping through of that sequence in addition to informing the sense devices to initiate a Read operation during that frame conversion. Thus, there is provided an MTR pulse on a line 130 that indicates the beginning of a strobe. The actual frame conversion, i.e., the beginning of the scan operation of the panel (or a portion of the panel) would be initiated by the master though a communication path with each of the devices. In this embodiment, the master is referred to as the Tx pulse device 112 whereas the remaining devices 108, 110 and 114 are defined as slaves. The master/slave relationship is primarily related to the chip that is configured to inform the slave chips that a frame conversion is being initiated and then generate a pulse for each strobe of a particular Tx channel, this being the "start-of-pulse" signal. Each start-of-pulse signal not only causes the initiation of a strobe, but it also results in the increment of an internal counter at the end thereof such that the next pulse will initiate a second strobe operation in the Tx device and will also cause the results of the receive operation to be stored in a subsequent section of the memory, as will be described herein below. Each of the devices is connected to a common MTR clock. The master will generate that common clock for output on a line 132 which will be provided as an input to the slave devices. This could be a wired OR operation. Thus, there will be provided one clock among all of the devices to which all are synched and one start-of-pulse generator. All of these functions do not necessarily need to be on the same device, but the disclosed embodiment shows them to be all generated by the Tx device 112—the master. Additionally, communication occurs between the different devices via a serial data bus 134. The serial data bus 134 could utilize an I2C protocol which is a two-wire bus utilizing a clock line and a data line. This could also utilize an SMBus which utilizes I2C technology. Even a UART or SPI (Serial Peripheral Interface) communication path could be utilized. This allows any of the devices, each of which includes a processing unit, to communicate with the other devices. Thus, one of these devices would be a host or would utilize the SMBus technology.

Figure 2:
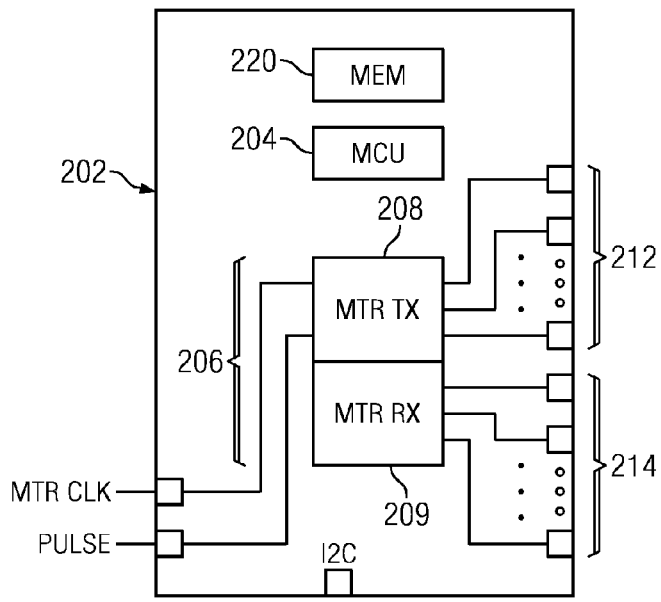
FIG. 2 illustrates a simplified diagrammatic view of one of the capacitive sensing chips.

Referring now to FIG. 2, there is illustrated a diagrammatic view of a single one of the devices, represented by an integrated circuit 202. Each of the integrated circuits includes a basic microcontroller unit 204 which is a system that includes an on-board processor and various peripheral devices in addition to data conversion purpose such as an ADC or a DAC. The operation of the MCU is described in detail in U.S. Pat. No. 7,171,542, issued Jan. 30, 2007 to the present assignee and entitled RECONFIGURABLE INTERFACE FOR COUPLING FUNCTIONAL INPUT/OUTPUT BLOCKS TO LIMITED NUMBER OF I/O PINS, which is incorporated herein by reference in its entirety. Additionally, there is provided a separate hardware MTR block 206 which performs the MTR functionality. This includes an MTR Tx portion 208 and an MTR Rx portion 209. The MTR Tx block 208 is interfaceable with a plurality of pins 212 whereas the MTR Rx portion 209 is associated with a plurality of pins 214. The pins 212 are the MTR Tx pins and the pins 214 are the MTR Rx pins. These will be associated with the respective columns or rows, as described herein above with respect to FIG. 1. The MTR block 206 is a hardware block including a clock, various counters, etc. It is operable to perform substantially all of the scanning functions necessary to generate the Tx signal and process the receive data. The integrated circuit 202 is illustrated as including both the MTR Tx portion 208 and the MTR Rx portion 209; however, it should be understood that the particular integrated circuit 202 could contain a single functionality MTR Tx or MTR Rx. Further, the integrated circuit 202 could be utilized where either one of the MTR Tx or MTR Rx portions were disabled such that, in effect, it utilizes one functionality. The MCU is operable to interface with the MTR block 206 and a memory 220 in order to process Rx data stored therein. The MTR Rx portion 209 is operable to receive the data and provide it into a latched output for processing, which processing could merely require the data to be stored in the memory for later processing or for processing during each strobe.

Figure 3:
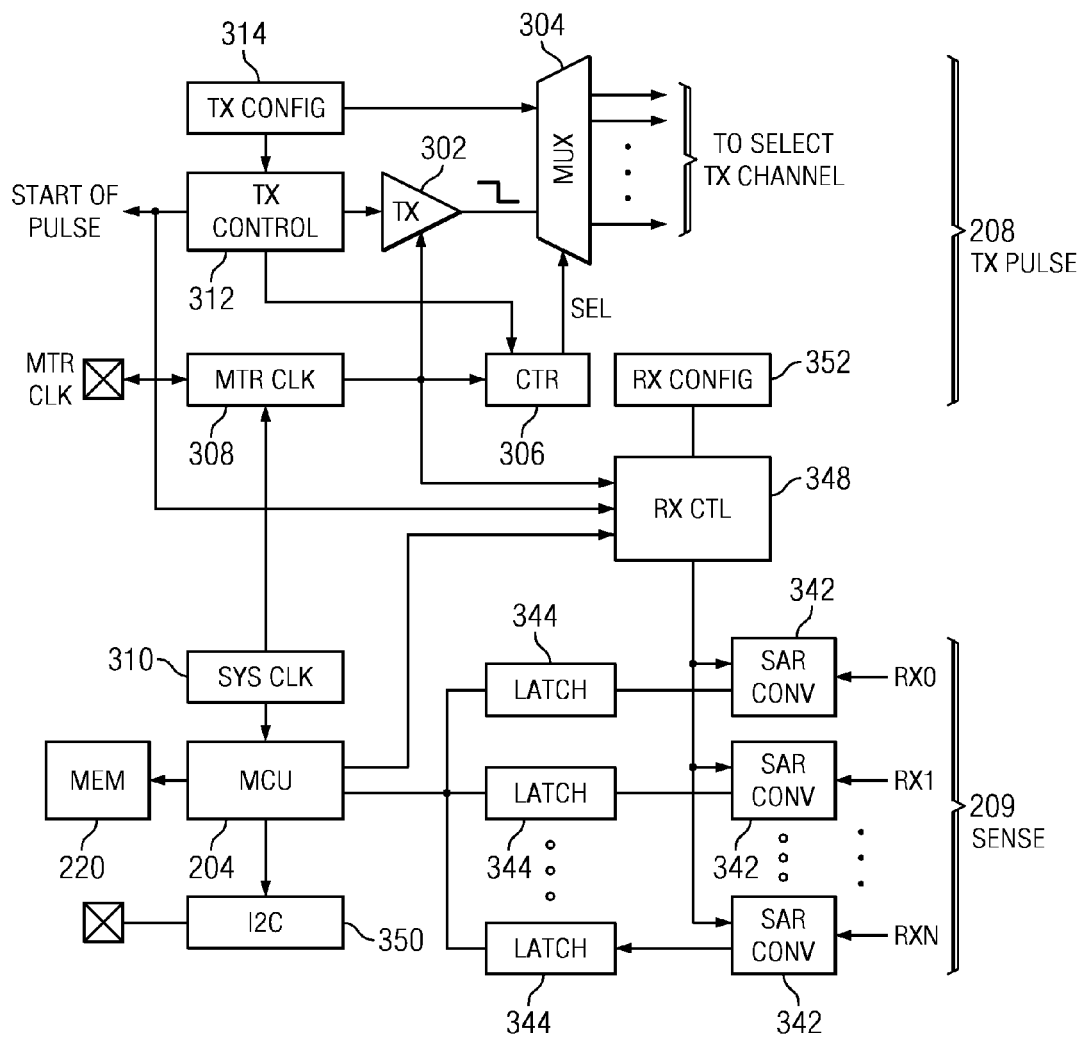
FIG. 3 illustrates a block diagram of the sensor chip.

Referring now to FIG. 3, there is illustrated a block diagram of the integrated circuit 202 with more detail of the MTR block 206. The transmit portion 208 includes a transmitter 302. In this embodiment, a pulse is utilized for the Tx signal. However, it should be understood that a sine wave or other type of signal could be utilized (the receiver being unique to each Tx signal type). The transmitter 302 provides an output to a multiplexer 304 which is operable to select one of the plurality of Tx channels, one selected for any given strobe. The select operation is controlled through the output of a counter 306, this counter operable to be incremented at the end of each strobe. All the functionality of the MTR block 206 is controlled by an MTR clock 308. The MTR clock 308 could be a free running clock or it could be synchronized with a system clock 310. The MTR clock, in the master mode is output on the MTR Clk line. In the slave mode, this will be an input. There could also be an external clock for synchronizing the MTR clock 308 such that this line is an input for both slave and master. The MTR clock 308 will provide the timing for the counter 306, such that it will be incremented synchronous with the edge of the MTR clock 308. A Tx control block 312 controls the operation of the transmitter by controlling the time at which the pulse edge is generated where, in this embodiment, the voltage on the Tx channel is changed from a high voltage to a low voltage. Again, all of this is synchronous with the edge of the MTR clock 308. Additionally, Tx control 312 will generate the start of pulse signal when in the master mode and, in the slave mode, this will constitute an input. A Tx configuration block 314 is operable to define the configuration of the overall operation. This configuration will indicate whether a particular block is a master or a slave. Additionally, the multiplexer operation for selecting various channels can also be controlled. For example, it may be that not all of the available Tx channels that can be accommodated by a particular chip need to be selected. Further, it may be that a select region of the touch screen panel would be scanned such that, for example, Tx channels Tx24-Tx31 would be selected out of a total of the Tx0-Tx31 channels. This would be for scanning a portion of the touch screen panel. Thus, when the frame conversion is initiated, the Tx control 312 would generate a pulse when in the master mode to initiate the first strobe and then, after the strobe was complete, the counter 306 would be incremented and the next Tx channel selected. After all of the Tx channels have been stepped through in one device, if this were the first device, then the next start-of-pulse would be incrementing the Tx counter in the next device. The start-of-pulse would continue to control the receive operation if the receiver were enabled.

The receive portion 209 is comprised of a plurality of SAR conversion devices 342 each having an input connected to a respective one or more of the Rx channels Rx0-RxN and an output provided to a respective latch 344. During a conversion operation, each of the SAR converters will transfer charge from $C_{RC}$ to an internal capacitor and convert this charge to a digital value. This thus provides a data conversion operation and will be referred herein as either a SAR device or an ADC. Both terminologies are consistent.

The output of each of the latches 344 can be accessed by the MCU 204 for processing thereof at the end of a particular strobe. At the initiation of each strobe, all the SAR devices 342 will need to be reinitiated. An Rx control block 348 is operable to configure the receive device 209 such that the number of channels that are defined as Rx channels will be defined. The MCU 204 is operable to interface with the memory 220 and is clocked by the system clock 308. The MCU 204 is operable to utilize the I2C channel via an I2C peripheral 350 to communicate with the other devices. This peripheral, again, could utilize a UART functionality, an SMBus functionality or any other type of communication path for accessing of the devices. The purpose of this, as will be described herein below, is to download data from other devices such that all or a portion of the panel data can be contained within one device for processing thereof. All of the receive functionality is defined by a receive configuration block 352.

Figure 4:
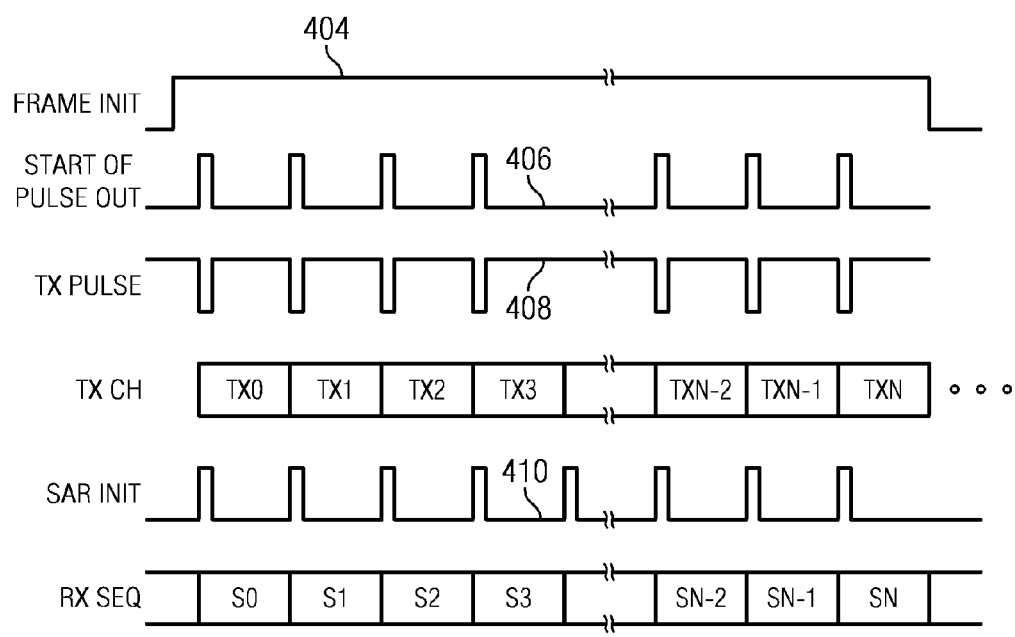
FIG. 4 illustrates a timing diagram for the overall sensing operation for the multi-chip system.

Referring now to FIG. 4, there is illustrated a timing diagram for the operation of scanning a panel. The panel scan is referred to as a frame conversion. This frame conversion will basically collect data at each of the intersections of row and column lines. The frame will be initiated by a frame initiation signal illustrated at an edge 404. This can be provided by a signal sent across the communication channel such as the I2C line 134 or it could even be some type of modulation of the MTR clock line (not shown). All that is necessary is to provide a frame synchronization operation that initiates the start-of-frame or start-of-panel scan. This frame synchronization signal will indicate to all of the devices that they are to initiate their count value at the first Tx channel and the memory store address at an initial address. The configuration data will define how many Tx channels are associated with each device operating as a transmitter. Thereafter, a transmit operation will be initiated when a start-of-pulse signal is received, the first being illustrated as a pulse 406 generated by the master. This will result in a first transmit pulse 408 going low. This will initiate the transmit operation. The transmit channels are illustrated as Tx0-TxN. Each start of pulse out edge will result in a subsequent falling edge of the Tx pulse, this being the signal that is transmitted for the beginning of a strobe. At the same time, each receiver will generate a SAR initiating operation, illustrated by a pulse 410. There will be the initiation of a SAR conversion operation for each Tx pulse, this indicating the start of conversion operation. At the end of the conversion, data will be stored in memory and the next conversion will sequence to another area of memory. For example, if the memory were mapped to the panel, each row of memory would be mapped to a panel row. By incrementing to the next row address in the memory, the next row of data would be stored. Typically, these are blocks of memory. However, any type of memory mapping could be utilized. For this operation, each device would maintain its own data during the data collection process for the entire panel scan or frame conversion. A receive sequencer would be provided for sequencing through each of the strobes or conversion cycles and this sequencer would be utilized to increment the memory pointer.

Figure 5:
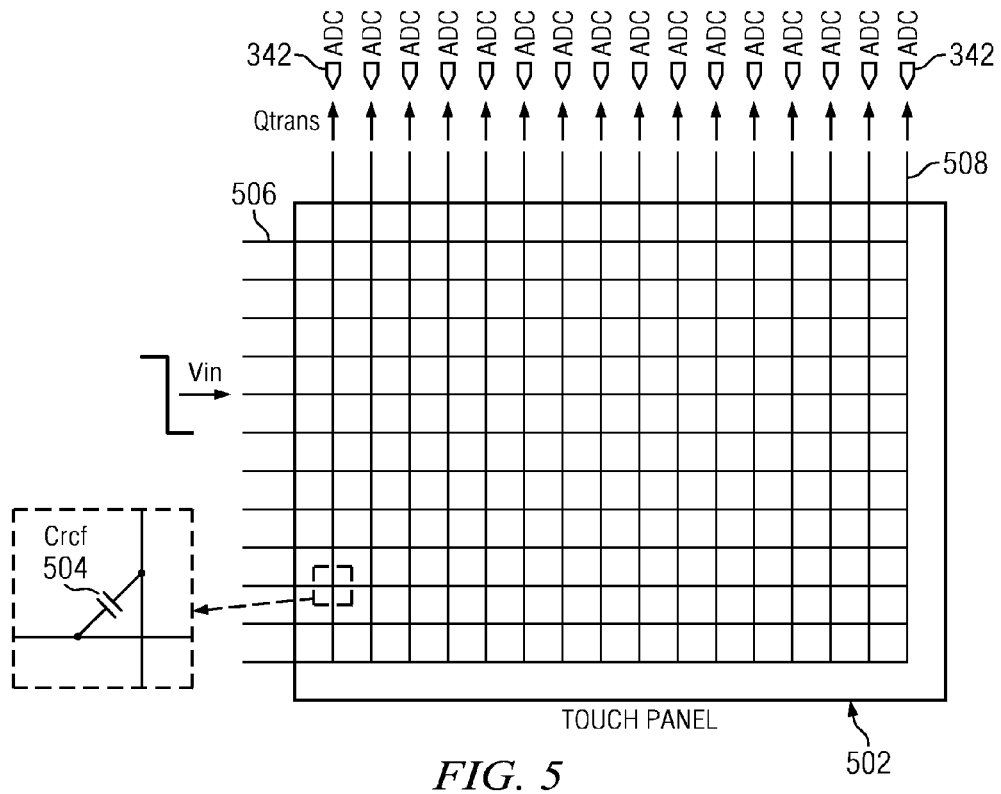
FIG. 5 illustrates a diagrammatic view of the touch panel interface with the receive side of the MTR function.

Referring now to FIG. 5, there is illustrated a diagrammatic view of a touch panel 502 representing the touch screen 104. The touch panel 502 is a capacitive touch panel that is comprised of a plurality of transparent row lines and column lines, the row lines being parallel to each other and the column lines being parallel to each other. These row and column lines are electrically isolated from one another and are all transparent. Each of these row or column lines provides an interconnecting mesh for an array of conductive shapes, such as diamond shapes, wherein the mutual capacitance is defined between adjacent edges of two such shapes, such that a touch will cause a perturbation in the electrical field associated therewith. Typically, these conductive lines are formed from Indium Tin Oxide (ITO). This provides a mutual capacitance sensing medium such that, between the intersection of each row line and column line, there exists a row-to-column capacitance ($C_{RC}$) 504. The row lines are designated as lines 506 and the column lines are designated as lines 508.

In this illustration, each of the row lines 506 is sequentially driven by a negative going pulse and all of the column lines 508 are output simultaneously to a respective one of the ADCs 342 to allow charge to be transferred from the $C_{RC}$ associated with the intersection of the driven row 506 and the respective intersection between that row line 506 and the column line 508. Charge is transferred through $C_{RC}$ to the respective ADC 342 and a conversion performed to convert that quantum of charge transferred through of $C_{RC}$ to a digital value, which will be described in more detail herein below.

Figure 6:
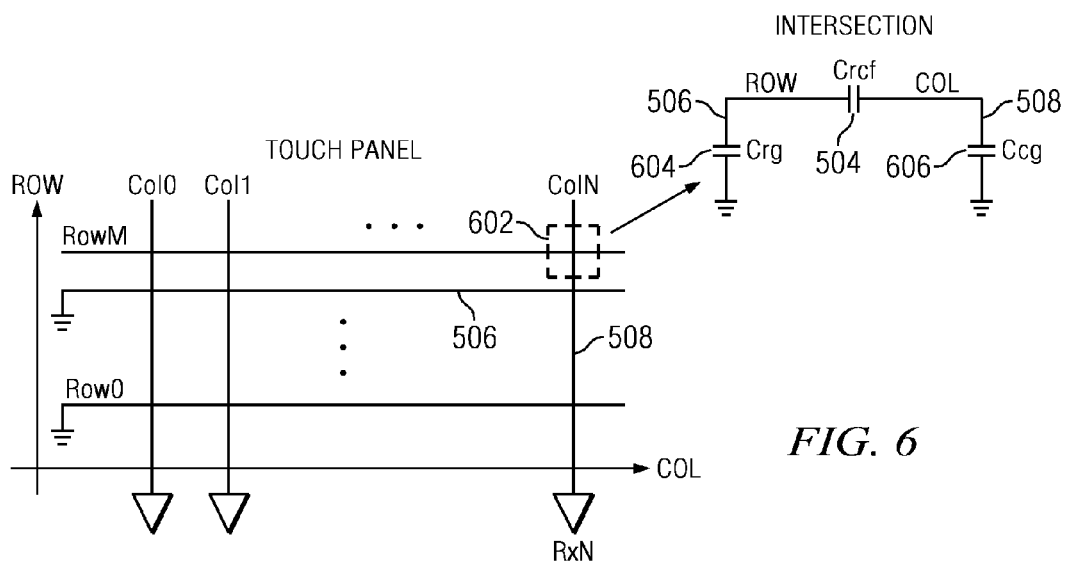
FIG. 6 illustrates a detail of the mutual capacitance at the intersection of the row and column lines.

Referring now to FIG. 6, there is illustrated a detail of the touch panel 502 illustrating the intersection of the row lines 506 and the column lines 508 at a point 602. At this point, the circuitry therefor can be simplified as having the $C_{RC}$ for that intersection disposed between a row-to-ground capacitance ($C_{RG}$) 604 and the column-to-ground capacitance ($C_{CG}$) 606. Each of the row lines 506, depending upon the size of the panel, will have a capacitance to ground associated therewith. The larger the panel, the more the capacitance. This is also the case with respect to the $C_{CG}$ capacitance on the column line. The desire is to measure the capacitance change of $C_{RC}$ whenever a finger touch is present. If there is a finger touch, what will happen is that $C_{RC}$ will decrease while $C_{CG}$ and $C_{RG}$ increase. Thus, it is necessary that each intersection be scanned such that the change in that the value of capacitance $C_{RC}$ can be determined. It is noted that the stronger the touch, the stronger the change in capacitance. However, the MCU 204 that evaluates these values will determine from the intersection or intersections that exhibit a change in capacitance whether a finger touch has actually occurred and what that information means. The circuitry associated with the MTR functions to measure the capacitance, collect data and inform the MCU 204 of such.

Figure 7:
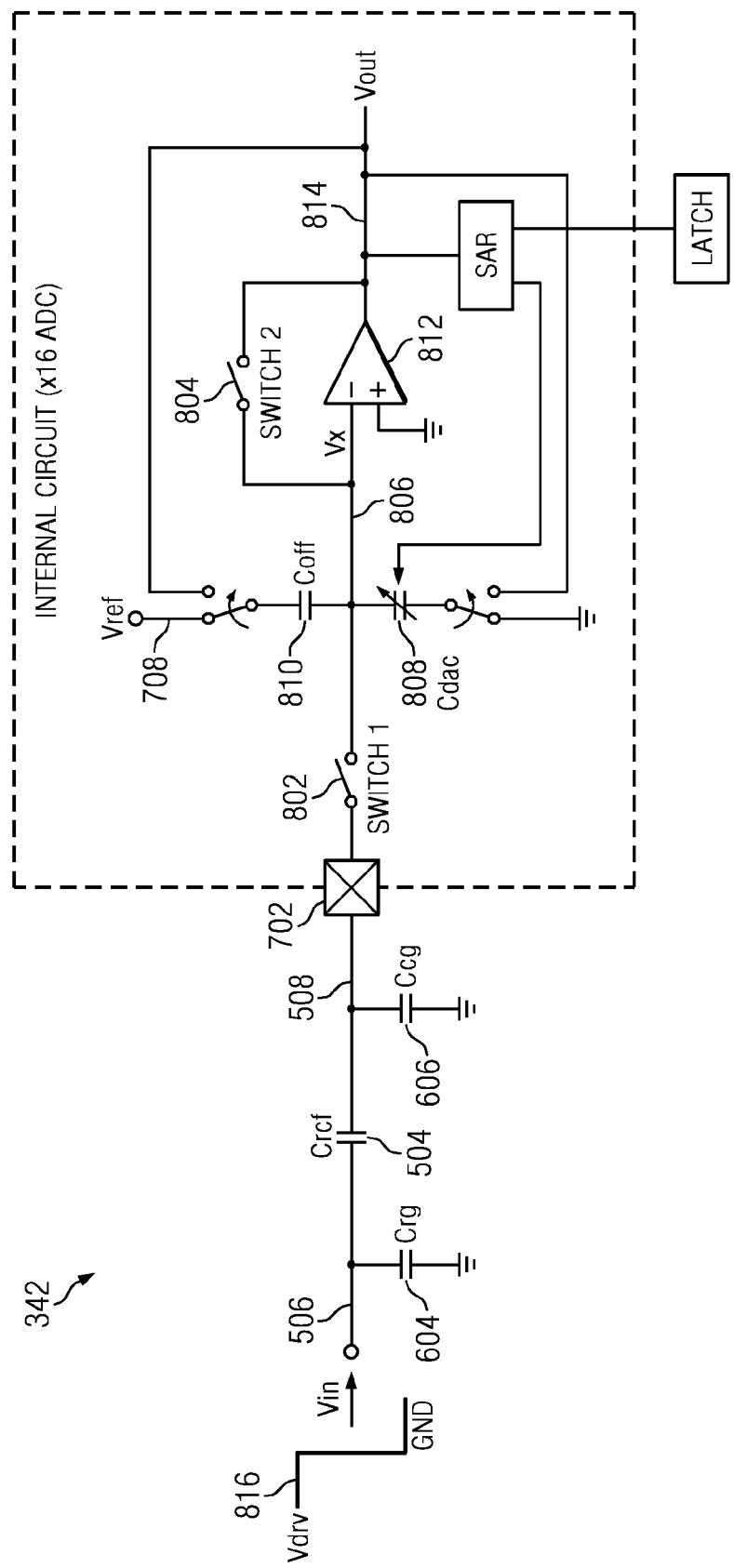
FIG. 7 illustrates a block diagram of the conversion system.

Referring now to FIG. 7, there is illustrated the basic configuration for the ADC 342. External to the chip at one of a package pin 702 associated with a particular MTR Rx input, one column line 508 will be associated therewith. A row line 506 will be driven, it being noted that there can be multiple ADCs 342 associated with respectively multiple column lines 506 that are perpendicular to the one single row line 506 that is being driven with the negative going edge referred to as $V_{IN}$. The ADC 342 interior to the IC 102 is defined by a dotted line to indicate that it is interior to the chip. The ADC 342 will be connected to or interfaced to the column line 508 through the pin 702. A switch 802 (switch 1) is operable to switchably connect the column line 508 to an internal node 806. Node 806 is connected to one plate of a variable capacitor 808 labeled $C_{DAC}$ and also to one plate of a reference capacitor $C_{REF}$ 810. The $C_{DAC}$ capacitor 808 has the other plate thereof connected to ground with the $C_{REF}$ capacitor 810 having the other plate thereof connected to a voltage $V_{REF}$. The node 806 is connected to the negative input of an amplifier 812, the positive input thereof connected to ground for illustrative purposes. In general, the positive node will be connected to a common mode voltage in most instances, but this could be ground and is illustrated as such for clarity purposes. It should also be noted that this particular amplifier 812 has an offset voltage. Therefore, the negative input will typically be offset by an offset voltage which, for this embodiment, is approximately 900 mV but can vary depending upon the amplifier circuitry. The switch 804 is connected between the node 806 on the negative input of the amplifier 812 and the output thereof to switchably connect the two together and basically short the negative input to the output to provide a unity gain amplifier. The output is labeled $V_{OUT}$. The purpose for the capacitor $C_{REF}$ 810 is to guarantee that the amplifier 812 works in the high gain region for the entire range of $C_{RC}$ such that any voltage variation across $C_{DAC}$ will not go above or below the rail voltage on the output of the amplifier 812.

The plate of capacitor 810 opposite to node 806 that is illustrated as being connected to $V_{REF}$ is actually switchably connectable between $V_{REF}$ on node 708 and the output of the amplifier on a node 814. Thus, the other plate of the capacitor can be connected to two different voltages. Similarly, the other plate of the $C_{DAC}$ capacitor 808, illustrated as being connected to ground, is switchably connectable between ground and the $V_{OUT}$ terminal 814. This will be clarified with the description herein below.

The goal of the operation is to initially charge up both the row line 506 and the column line 508 in what is referred to as an auto zero mode. This occurs at the high side of $V_{IN}$ at a point 816 at level $V_{DRV}$. Depending upon the size of the touch screen panel, the value of $C_{RG}$ (capacitor 604) can be rather large. Similarly, the capacitor $C_{CG}$ could also be large. Thus, there is required a certain amount of time for the appropriate nodes to be fully charged to the voltage $V_{DRV}$. This is a programmable length of time. It is noted that, prior to a "strobe" of any portion of the touch screen, all inputs (nodes 506 and 508) are grounded. In order to charge up the node 508, switch 804 (switch 2) is closed such that the unity gain amplifier will drive the negative input. In this configuration, the negative input is essentially disposed at a virtual ground which, if amplifier 812 had no offset, would be the voltage on the positive input thereof. However, with the offset, the negative input will be offset from the positive input by 900 mV in one embodiment, although this offset value is a design choice. In any event, it will be at a fixed voltage which will cause the node 508 to be charged to the virtual ground voltage, referred to as "$V_X$," and this will charge up the column to ground capacitor $C_{CG}$ 606, the $C_{DAC}$ capacitor 808 and the $C_{REF}$ capacitor 810 to $V_X$. The next step is the sampling or transfer operation wherein the charge through the $C_{RC}$ capacitor 504 is transferred onto the $C_{DAC}$ and $C_{REF}$ capacitors. To do this, switch 802 is maintained in a closed position but switch 804 is opened and the $C_{REF}$ and $C_{DAC}$ capacitors are connected in parallel between node 806 and the output of amplifier 812. This will effectively maintain the negative input at the virtual ground level $V_X$ that existed when switch 804 was closed. This will keep the column line 508 and the node 806 at the same voltage and then $V_{IN}$ is moved from the $V_{DRV}$ voltage to ground. This will effectively transfer the charge on capacitor 504 to the $C_{REF}$ and $C_{DAC}$ caps. A conversion operation is then implemented wherein the column line 508 is isolated from node 806 and then the charge difference on the $C_{DAC}$ and $C_{REF}$ capacitors determined with a successive approximation register (SAR) algorithm to determine a digital voltage representing the difference in charge by varying $C_{DAC}$. By isolating the column line from the ADC 342 during conversion, any interference that might occur during the conversion process will also be isolated. Thus, the operation will entail first charging up the capacitor 504, the $C_{RC}$ capacitor, with a quantum of charge. This quantum of charge is then transferred onto an internal capacitor or capacitors to change the charge disposed therein. This is followed by a determination of the change in charge. It is this change in charge that correlates to the charge on the capacitor 504. As will be described herein below, since the voltage on node 806 is maintained at the same voltage for the initial auto zero or charging operation of the column line and the charge transfer operation, this column-to-ground capacitor is effectively canceled out from the operation.

Figure 8:
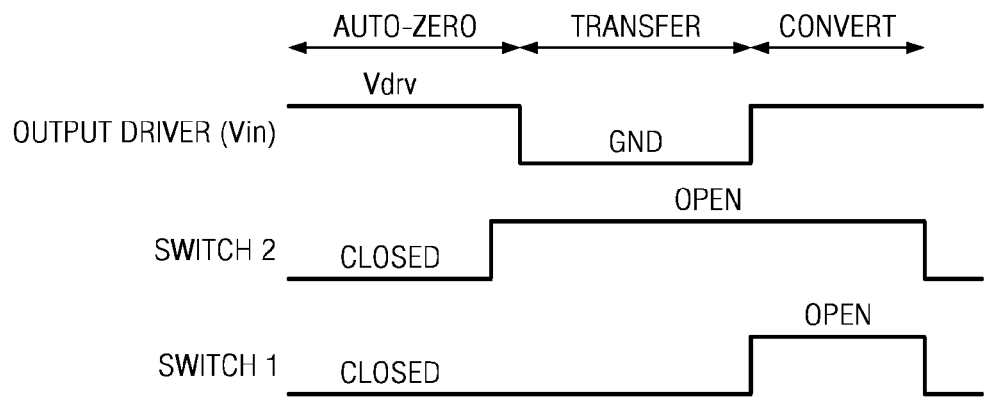
FIG. 8 illustrates a timing diagram for the conversion operation.

Referring now to FIG. 8, there is illustrated a timing diagram for the ADC operation. This ADC operation consists of three phases, an auto zero phase, a transfer phase and a charge to digital conversion phase. The first waveform illustrates the input driver signal that drives the row. This is a signal that is shifted between the drive signal $V_{DRV}$ and ground. Initially, in the auto zero phase, switch 804 (switch 2) is closed and switch 802 (switch 1) is closed. This allows both the column line 508 and the row line 506 to be charged up from the initial ground condition, noting that one row is driven by a Tx pulse, whereas 16 columns are connected to ADCs 342. As noted herein above, the column line is charged to virtual ground $V_X$ on the negative input of the amplifier 812. With the offset, this differs from the common mode voltage (or ground) on the positive input of the amplifier 812 by that offset voltage. The control of switches 802 and 804 in slave devices (not sharing the same chip) is effected with the start-of-pulse signal from the master.

In the next phase, the transfer phase, switch 804 (switch 2) is opened and the voltage of $V_{IN}$ driven to ground to transfer charge from the $C_{RC}$ capacitor (504) to the $C_{DAC}$ and $C_{REF}$ capacitors. Switch 802 (switch 1) still remains closed. Note that, when switch 804 is open, the opposite plates of $C_{DAC}$ and $C_{REF}$ which were originally connected to ground and $V_{REF}$, respectively, will be switched to $V_{OUT}$. This effectively transfers a charge onto $C_{DAC}$ and $C_{REF}$. At the end of the transfer phase, the convert phase is initiated with switch 804 still remaining open. The opposite plates of capacitor $C_{DAC}$ and $C_{REF}$ from node 806 are again switched to ground and $V_{REF}$, respectively, and then switch 802 (switch 1) opened. During this phase, the amplifier 812 functions as a comparator in a SAR conversion operation, which will be described herein below.

Figure 9:
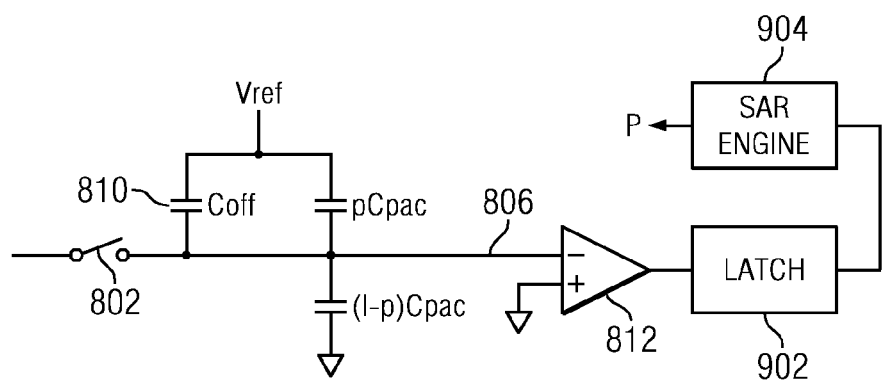
FIG. 9 illustrates a block diagram of the SAR engine in operation with the ADC.

Referring now to FIG. 9, there is illustrated a diagrammatic view of the SAR engine during the conversion phase. During this phase, the amplifier 812 is configured as a comparator and switch 802 (switch 1) is open, thus isolating node 806 from the array and, thus, preventing any noise from being passed across switch 802 from the array. $C_{DAC}$ is comprised of multiple capacitors such that a portion of the capacitor $C_{DAC}$ can be disposed between node 806 and ground and a portion can be disposed between node 806 and $V_{REF}$. The output of amplifier 812 is input to a latch 902, the output thereof utilized by a SAR engine 904 to generate the value of "p." The $C_{DAC}$ capacitor is comprised of a 5-bit binary capacitor section and a 5-bit thermometer section. The binary section is comprised of a combination of unit capacitors which stores a value "C" such that the capacitors in the 5-bit binary array are C, 2C, 4C, 8C and 16C, resulting in 32 unit capacitors. The thermometer portion will have $2^5-1$ capacitors or 31 capacitors of size 32C. This type of DAC is usually referred to as a hybrid DAC wherein the thermometer coded bits are associated with the five most significant bits and the binary weighted bits are associated with the five least significant bits. With the binary weighted portion of the DAC, elements corresponding to the more significant bits are weighted higher than elements corresponding to the less significant bits. With respect to the thermometer coded DAC portion, the number of asserted bits in the thermometer code would be proportional to the value of the digital signal and each bit of the thermometer code is provided to a corresponding capacitor. All that is needed is a binary to thermometer decoder to generate the thermometer code from the binary code.

During the SAR operation, the first step will be to assert the most significant bit and determine if node 806 is at or below the trip point. As described herein above, the trip point will be the virtual ground which is basically the voltage offset from the positive input voltage. Even though this voltage is illustrated as being connected to circuit ground, it would typically be connected to a common mode voltage generated on-chip. Thus, when the voltage goes above the trip point, the output of amplifier 812 will go negative and, when it is below the trip point, the output will go positive. The SAR engine 904 will test each bit to determine if the voltage on node 806 is above or below the trip point. If it is below the trip point, that bit will be maintained as a latched value and then the next value tested, such that each lower MSB can be tested in sequence. If the next MSB causes the voltage to go above the trip point, this bit is maintained at a logic "0" for the value "p." At the end of the SAR operation, after 10 bits, the value will be latched and this will constitute the result. What this value indicates is a digital value corresponding to the charge that was transferred to $C_{REF}$ and $C_{DAC}$. As noted herein above, if the value of the transferred charge were "0," there would have been no change in the charge stored on $C_{REF}$ and $C_{DAC}$ and the voltage on node 806 in that situation would have been equal to the trip point voltage (the virtual ground voltage) and the result would be that value of "p" would be equal to zero. Thus, by transferring the charge to the capacitors $C_{REF}$ and $C_{DAC}$ and then isolating node 806 from the array, a conversion can be made to a digital value that represents the charge on $C_{RC}$. This is thus a data converter that converts charge to a digital value or a charge-to-digital converter.

To determine that there is a touch, a comparison is made of a current value of $C_{RCF}$ to a prestored value representing the no-touch situation. This is referred to as the "baseline value." The baseline value for each of the $C_{RCF}$ capacitors in the array will be determined during a calibration operation. This calibration operation can be user initiated or it can be automatically based on time or even temperature. When the temperature of the device containing the touch screen and the chip changes, this can change the values of the capacitor $C_{RCF}$ and, therefore, there must be some type of calibration.

Figure 10:
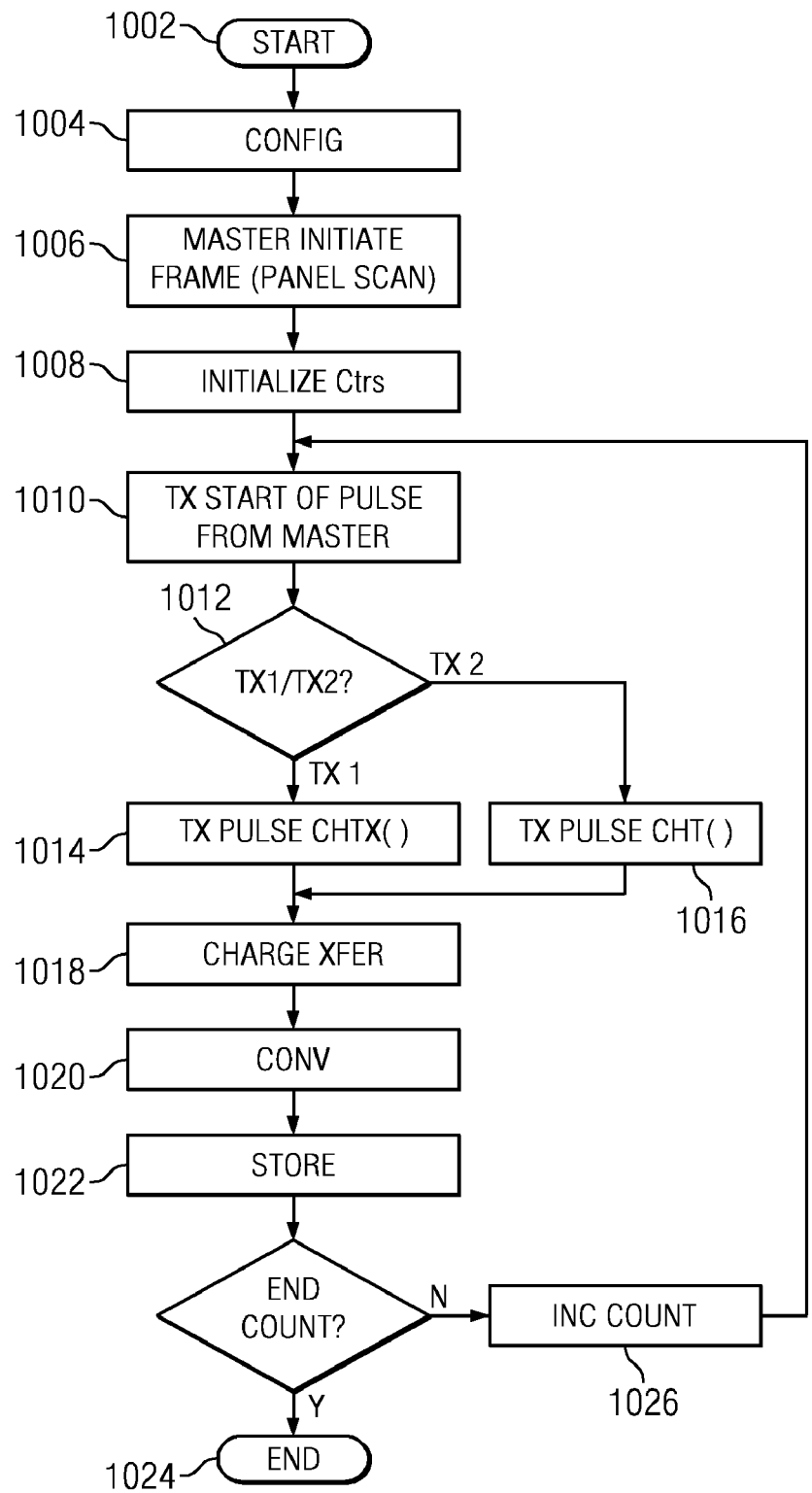
FIG. 10 illustrates a flow chart for the overall capacitive sensing function.

Referring now to FIG. 10, there is illustrated a flow chart depicting the overall operation for a frame conversion, i.e., a panel scan. The flow chart is initiated at a block 1002 and then proceeds to a block 1004. In this block 1004, the devices are configured. This configuration is an operation wherein each of the systems is configured as to whether they are a master or a slave in the system. They are also provided with information as to how many transmit channels or receive channels are associated with the panel scan operation thereof and also possibly as to the type of processing that is to be performed on received data. The program then flows to a function block 1006 wherein the master initiates a frame scan. The frame scan requires some type of signal to be transmitted to the slave devices such that they can reset their counters to the appropriate values, the counter primarily being reset for the transmit operation such that the slave transmitter is aware of the place in the count value at which it takes over the transmit operation. Use of the slave receive devices utilizes some type of receive counter that will allow the memory to sequentially store the information at different addresses. The program then proceeds to a function block 1008 to basically initialize the counters at their initial values and then to a function block 1010 to transfer the start of a pulse signal from the master, this indicating to each of the devices that a transmit operation is going to occur. In the receive devices, this will indicate that the conversion operation is to begin and all voltages must be preset at the appropriate levels to effect this conversion. For the transmitters, a decision is made at a decision block 1012 as to which transmitter is going to generate the transmit pulse, in the event that more than one transmit device is provided. For this disclosed embodiment, two transmit devices are illustrated, Tx device 112 and Tx device 114. Thus, the program will either flow to a block 1014 to generate the pulse from Tx device 112 or to block 1016 to transmit a pulse from Tx device 114. They are transmitted on the appropriate transmit channel indicated by the count value thereat. The program then flows to a function block 1018 wherein the charge is converted at a function block 1020. After conversion, the data is stored in memory at a function block 1022. Once the data is stored, a decision is made as to whether the count value has ended, i.e., has the frame conversion been completed and all transmit channels serviced. If so, the program will flow to an End block 1024. However, if not, the counter will be incremented at a block 1026 and then returned to the input of block 1010 to generate the next start-of-pulse signal for the next transmit channel and the memory will be incremented for the receive devices.

Figure 11:
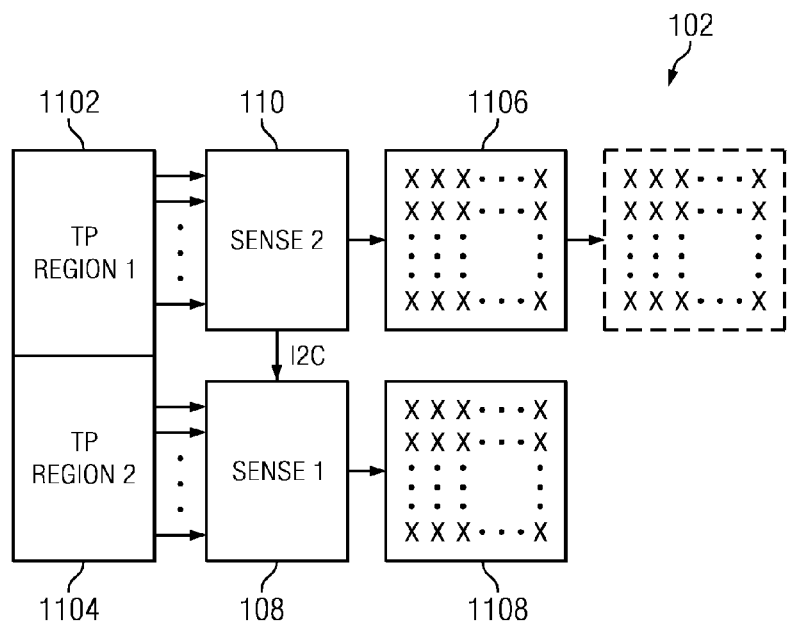
FIG. 11 illustrates a block diagram for the memory mapping.

Referring now to FIG. 11, there is illustrated a diagrammatic view of the memory mapping. The touch screen panel 102 is divided into two regions, a touch panel region one, labeled 1102 and a touch panel region two, labeled 1104. The first region 1102 has the row lines thereof associated with the sense device 110 and the second region 1104 has the row lines thereof associated with the sense device 108. As noted herein above, each of these sense devices for the receive operation can be part of a chip associated with the transmit operation or they could be separate.

Each of the sense devices 108, as described herein above, for a given strobe or start-of-pulse operation will transfer charge from the mutual capacitance and convert this charge on each row to a digital value representative of the charge stored in $C_{RC}$, this representing the mutual capacitance of the intersection of the particular column being driven and the row sensed. This value represents a "pixel" or intersection on the touch screen panel 102. This will be mapped into a memory, there being one memory area 1106 in sense device 110 and one memory area 1108 in sense device 108. Each of these memory areas 1106 and 1108 represent an area of the general memory 220 in the integrated circuit. This memory 220 is utilized for other functions such as storing instructions and the such for the operation of the overall chip. This will typically be RAM. As noted herein above, one mapping technique would be to map a row of memory to a given row line such that all of the data will be stored therein merely by incrementing the column line for a particular memory for the output to each of the latches 344 in the SAR device. For the next strobe, the row line pointer in the memory is incremented. This is merely an addressing scheme that will facilitate mapping of the touch screen panel into memory. The result will be a value associated with each $C_{RC}$ in the touch screen panel. From the standpoint of the sense devices 108 and 110, each, during its processing, is unaware of the data that is being collected by the other of the sense devices. Thus, the sense device is operable to collect data for its associated region 1102 or 1104 and store this information. Further, each of the sense devices 108 and 110 has the ability to process this data and determine if a touch exists. A touch is usually indicated by the fact that $C_{RC}$ has changed from the last value. This would make use of a previous value stored in another area of memory and then a comparison made of the current value with the previous value. If this value changes, this indicates a possibility of touch and then some type of algorithm will be applied to the data in the region of a given touch indication to determine if an actual touch had occurred. The algorithm is useful since noise and the such can cause a false reading on one intersection. Typically, a touch results in $C_{RC}$ value changes in multiple row/column intersections about a certain area.

Figure 12:
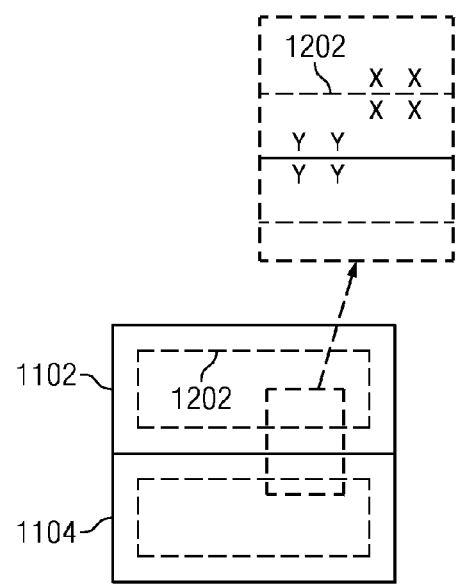
FIG. 12 illustrates a detailed diagram of the touch screen panel.

Alternatively, the master or even the slave can cause the information from the memory 1106 to be transferred to the memory 220 associated with sense device 108. This would allow all of the touch panel data to be contained in one device. The reason that this is important is that touch indications at a boundary of region one and region two adjacent each other would involve analysis of data on either side of the boundary. This can more accurately be achieved if that information is processed from a common memory. This is illustrated in FIG. 12 wherein it can be seen that the touch indication labeled "X" on 1102 is contained above a certain boundary edge 1202. As long as the touch indication is above that level, there are sufficient pixels below that level which can be utilized for the analysis. This boundary 1202 is a phantom boundary that allows additional pixels to be evaluated on either side of the boundary. Once the activated pixels approach the actual boundary between region one and region two, as indicated by the "Y" pixels, this involves analysis of data from both sense devices 108 and 110. This analysis is done after a frame conversion is complete. Alternatively, there can be multiple frame conversions that are utilized in order to evaluate data from a sequential set of frame conversions in order to make a determination as to whether a touch has occurred or not.

It will be appreciated by those skilled in the art having the benefit of this disclosure that this master-slave triggering for capacitive sensing applications using multi-touch resolve provides a multi-chip solution to sensing capacitance changes in a touch screen panel. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A touch panel scan system for detecting a change in mutual capacitance on a surface of a touch panel, comprising:
    a first touch detect device having a transmitter for transmitting a signal to a select one of a plurality of first lines on a first edge of a touch panel to facilitate a single line scan operation;
    a second touch detect device coupled with a select one or ones of second lines on a second edge of the touch panel and having a receiver for receiving therefrom and processing thereof transmit signals coupled thereto from the select one or ones of the first lines to detect changes in a mutual capacitance associated with the select one or ones of the second lines and the first line; and
    at least one of the first or second touch detect devices functioning as a master and the other functioning as a slave, with the master coupled to the slave and generating a start-of-scan signal external to the first and second touch detect devices to initiate a single scan operation of a select one of the first lines.

2. The system of claim 1 wherein the second touch detect device is coupled to a plurality of second lines and the receiver comprises a plurality of discrete receivers, each associated with one of the plurality of second lines, the discrete receivers simultaneously receiving and processing the transmit signal from all of the plurality of second lines during a single scan operation of the select one of the first lines.

3. The system of claim 1 wherein the first touch detect device includes a sequencer for sequentially transmitting the transmit signal to a plurality of the first lines for respective and sequential single line scan operations, and wherein a start-of-scan signal is generated for each generation of the transmit signal.

4. The system of claim 1, wherein the transmit signal comprises a pulse edge.

5. The system of claim 1, and further including a plurality of second touch devices, each interfaced with different select ones of the second lines on the second edge of the touch panel.

6. The system of claim 5, wherein the first touch detect device and at least one of the second touch devices are contained in a common integrated circuit.

7. The system of claim 1, wherein the first touch detect device is the master and the associated second touch device with internal synchronization.

8. The system of claim 1, and further comprising a plurality of first touch detect devices, each of the first touch detect devices having a transmitter for transmitting a signal to a select one of the plurality of first lines on the first edge of the touch panel to facilitate a single line scan operation and wherein the ones of the first lines interfaceable with one of the first touch detect devices being different from the ones interfaceable with the other of the first touch detect devices and each synchronized with the other such that one can select a first line at a given time.

9. A touch panel scan system for detecting a change in mutual capacitance on the surface of a touch panel that includes a plurality of touch regions with an associated mutual capacitance that changes based on a touch/no touch condition, comprising:
 a first transmit device having a transmitter capable of transmitting a TX signal to select ones of the touch and a multiplexer for selecting one thereof for transmitting the Tx signal to in order to facilitate a single scan operation;
 a first receive device interfaced with a select one or ones of touch regions for receiving therefrom and processing thereof Tx signals coupled thereto through the mutual capacitance of the selected one of touch regions to detect changes in the mutual capacitance associated therewith; and
 at least one of the first transmit or receiver devices functioning as a master and the other functioning as a slave, with the master coupled to the slave and generating a start-of-scan signal to initiate a single scan operation of a select one of the touch regions.

10. The system of claim 9 wherein touch regions are arranged in a plurality of groups and the multiplexer in the first transmit device is operable to select one of the plurality of groups in a single scan operation for transmission of the Tx signal to all of the touch regions therein.

11. The system of claim 10, wherein the first receive device includes a plurality of discrete receivers, each associated with one of the plurality of touch regions in the selected group of touch regions, the discrete receivers simultaneously receiving and processing the Tx signal from all of the plurality of touch regions in the selected group of touch regions during a single scan operation of the select group of touch regions.

12. The system of claim 11, and further including at least a second receive device, each of the first and second receive devices are interfaced with different select ones of the groups of touch regions.

13. The system of claim 12, wherein the first transmit device and at least one of the first and second receive devices are contained in a common integrated circuit.

14. The system of claim 9, wherein the first transmit device is the master and the associated first or second receive device with internal synchronization.

15. The system of claim 9 wherein the first transmitter device includes a sequencer for controlling the multiplexer to sequentially select different touch regions and transmit the Tx signal thereto for respective and sequential single scan operations, and wherein a start-of-scan signal is generated for each generation of the Tx signal.

16. The system of claim 9, wherein the Tx signal is a pulse edge.

17. The system of claim 9, and further comprising a plurality of first transmit devices, each of the first transmit devices able to be coupled with different ones of the touch regions and each synchronized with the other such that one can select a touch region at a given time.

18. A sense circuit for sensing the value of the mutual capacitance on a touch area on a surface of a touch panel, comprising
 a processor;
 a hardware controller including:
  a clock,
  a transmit section having:
   a transmitter for generating a transmit signal that can be coupled across the mutual capacitance of a touch area,
   a multiplexer for multiplexing the output of the transmitter to a select one the touch areas,
  a capacitance sense section having:
   a converter coupled to the select one of the touch areas selected by the multiplexer for generating a digital value representing the value of the mutual capacitance associated with the coupled-to touch area, the converter operating in response to receiving a converter initiating signal,
   a latch for storing the digital value at the end of the conversion operation, and
   a control section for controlling the multiplexer and transmitter to transmit the transmit signal to the select touch area and generate the start of conversion operation in response to a start-of-sense signal, the transmit section and the capacitance section operating as either in a master or a slave mode wherein the control section in the master mode generates the start-of-sense signal and, in the slave mode, receiving the start-of sense signal from an external source and wherein the timing of the generation of the transmit signal and the converter initiating signal are synchronized to the clock.

19. The sense circuit of claim 18, wherein there are a plurality of groups of touch areas and the multiplexer is operable to select one of the plurality of groups of touch areas for multiplexing the output of the transmitter to and further comprising a plurality of converters in the capacitance section, each coupled to a respective one of the touch areas in the multiplexer selected group.

20. The sense circuit of claim 19, wherein the processor is operable to access the contents of the latch for processing of the information therein.

* * * * *